(12) United States Patent
Schade et al.

(10) Patent No.: US 8,240,198 B2
(45) Date of Patent: Aug. 14, 2012

(54) METHOD FOR DETERMINING THE PROFILE DEPTH OF A TIRE AND/OR A TIRE CHARACTERISTIC, AND A TIRE

(75) Inventors: Kai Schade, Oberursel (DE); Andreas Heise, Erzhausen (DE); Stefan Kammann, Kelkheim (DE)

(73) Assignee: Continental Teves AG & Co. oHG (DE)

( * ) Notice: Subject to any disclaimer, the term of this patent is extended or adjusted under 35 U.S.C. 154(b) by 109 days.

(21) Appl. No.: 12/670,745

(22) PCT Filed: Jul. 23, 2008

(86) PCT No.: PCT/EP2008/059625
§ 371 (c)(1),
(2), (4) Date: Jul. 1, 2010

(87) PCT Pub. No.: WO2009/016074
PCT Pub. Date: Feb. 5, 2009

(65) Prior Publication Data
US 2010/0276044 A1 Nov. 4, 2010

(30) Foreign Application Priority Data

Jul. 27, 2007 (DE) .......................... 10 2007 035 299
Jun. 18, 2008 (DE) .......................... 10 2008 028 967

(51) Int. Cl.
*G01M 17/02* (2006.01)
(52) U.S. Cl. ........................................... 73/146
(58) Field of Classification Search ........... 73/146–146.8
See application file for complete search history.

(56) References Cited

U.S. PATENT DOCUMENTS

| | | | |
|---|---|---|---|
| 2007/0035386 A1* | 2/2007 | Pullini et al. | 340/442 |
| 2007/0277602 A1 | 12/2007 | Heise et al. | |
| 2009/0000370 A1* | 1/2009 | Lionetti et al. | 73/146 |
| 2009/0078347 A1* | 3/2009 | Niklas et al. | 152/154.2 |
| 2010/0139383 A1* | 6/2010 | Haswell et al. | 73/146 |

FOREIGN PATENT DOCUMENTS

| | | |
|---|---|---|
| DE | 197 45 734 A1 | 4/1999 |
| DE | 199 26 616 A1 | 12/2000 |
| DE | 199 54 825 A1 | 5/2001 |
| DE | 199 57 645 A1 | 5/2001 |
| DE | 10 2005 006 534 A1 | 4/2006 |
| EP | 1 314 580 A1 | 5/2003 |
| WO | WO 2005/032856 A2 | 4/2005 |

* cited by examiner

*Primary Examiner* — Andre Allen
(74) *Attorney, Agent, or Firm* — RatnerPrestia

(57) ABSTRACT

A method used for determining a profile depth or wear on a tread of a tire of a vehicle, and/or a tire characteristic, a magnetic field being detected by a magnetic field sensor disposed in the interior of the tire, particularly in the area of the tread on the tire interior, or at a distance from the tire, particularly in the area of a wheel housing or a wheel well of the vehicle, the magnetic field being transmitted or changed by at least one indicator element disposed in the tread on the tire exterior. The current wear state of the tread and/or the tire characteristic, particularly a tire type and/or permissible top speed, is determined based on output signals of the magnetic field sensor. The invention further relates to tires.

30 Claims, 3 Drawing Sheets a)

b)

METHOD FOR DETERMINING THE PROFILE DEPTH OF A TIRE AND/OR A TIRE CHARACTERISTIC, AND A TIRE

CROSS REFERENCE TO RELATED APPLICATIONS

This application is the U.S. national phase application of PCT International Application No. PCT/EP2008/059625, filed Jul. 23, 2008, which claims priority to German Patent Application No. 10 2007 035 299.0, filed Jul. 27, 2007 and German Patent Application No. 10 2008 028 967.1, filed Jun. 18, 2008, the contents of such applications being incorporated by reference herein.

BACKGROUND OF THE INVENTION

1. Field of the Invention

The invention relates to a method with which a profile depth or wear on a tread of a tire of a vehicle and/or a tire characteristic are/is determined in a tire and to a tire.

2. Description of the Related Art

Electronic systems are being increasingly used in modern motor vehicles to improve the safety of the vehicle. For example, inter alia, a correct tire pressure and the current state of the tires, for example the current depth of the tire profile, are aspects of a vehicle which are relevant to safety. Likewise common knowledge of tire characteristics, for example in brake control systems such as, for example, an anti-lock brake system (ABS) or electronic stability program (ESP), are advantageous since the control algorithms of these systems can be adapted to the tire characteristic and therefore improved, which further increases the safety of the vehicle.

What are referred to as directly measuring tire pressure-monitoring systems are known which use pressure sensors in the individual tires to determine the respective pressure in the relevant wheel. DE 199 26 616 A1, which is incorporated by reference, describes a tire pressure-monitoring system which comprises a central unit on the vehicle and a tire pressure-control device with a pressure sensor in each tire, wherein each tire pressure-control device transmits data to the central unit. DE 10 2005 006 534 A1, which is incorporated by reference, discloses a tire pressure-monitoring device in which in each case a transponder which is arranged in the tire and which senses the tire air pressure transmits information and energy to an associated wheel case transceiver which is arranged in the region of the wheel case.

DE 197 45 734 B4, which is incorporated by reference, discloses a wear sensor for sensing the profile depth of a tire of motor vehicles, wherein an electrical or electromagnetic measuring element which is dependent on the wear is cast into the profile lugs of the tire, said measuring element interacting with a sensor circuit which is also cast into the tire. The measuring element is composed of a plurality of electrically conductive loops which are successively cut through at different profile depths. Since the measuring element and sensor circuit are cast into the tire it is not possible, for example in the case of a malfunction of the sensor, to replace the faulty components of the wear sensor.

SUMMARY OF THE INVENTION

The invention relates to the object of proposing a method and a tire with which/in which the current profile depth and/or a tire characteristic can be easily and reliably determined. The intention here is that it will also be possible to easily replace the sensor which is used to determine the profile depth and/or the tire characteristic. Furthermore, the intention is that it will be possible to implement the method and the tire as simply and cost-effectively as possible, i.e. the intention is that as far as possible components of already existing systems, for example of a tire pressure-monitoring system, will also be used.

The term "inside of the tire" and respectively "outside of the tire" relate, according to aspects of the invention, to the mesh/network/screen of steel and aramide (aromatic polyamides) or generally a fiber or a combination of a plurality of fibers under the tread. "Inside of the tire" or "outside of the tire" relates to the respective surfaces of this layer. Correspondingly, for example, the tread of the tire is located on the outside of the tire, while, for example, the inner liner is located on the inside of the tire.

The invention relates to the idea of emitting (or generating) a magnetic field or changing an existing magnetic field by means of an indicator element arranged in the tread on the outside of the tire, and of sensing or monitoring this magnetic field by means of a magnetic field sensor which is arranged in the interior of the tire or at a distance from the tire. The current state of wear of the tread and/or the tire characteristic are/is then determined by means of the output signals of the magnetic field sensor.

The indicator element is preferably manufactured from permanently magnetic or ferromagnetic or diamagnetic material or it contains such material. Accordingly, the indicator element is composed of a material or of a combination of materials (for example ferromagnetically enriched rubber). The indicator element is preferably embodied as a spatial structure with extensions in three spatial directions, however, it is also preferably embodied as a layer (in a planar fashion).

The magnetic field sensor is preferably provided in the interior of the tire since it is better protected there against environmental influences and soiling. In this context, the magnetic field sensor is particularly preferably arranged in the region of the tread on the inside of the tire, for example on the inner liner, since the spatial proximity of the indicator element and magnetic field sensor then permit more precise detection of changes in the magnetic field by means of the indicator element.

According to one development of the invention, the indicator element or elements is/are permanently magnetic or ferromagnetic, with the result that the indicator element or elements emits/emit a magnetic field which can be sensed by the magnetic field sensor. The current state of wear of the tread at one or more locations and/or the tire characteristic are/is determined by analyzing the strength and/or the direction of the magnetic field, even for example when the tire is rotating. The permanently magnetic or ferromagnetic indicator element or elements is/are particularly preferably countersunk into a recess or recesses in the tread to at least one depth. In the case of a (flat) indicator element which is extended essentially in just two spatial directions, the recess is quite particularly preferably arranged at a depth which depends on the legally prescribed minimum profile depth, and which in particular corresponds to the legally prescribed minimum profile depth. In the case of an indicator element which is extended spatially (in three spatial directions), it is quite particularly preferred that the depth to which the indicator element is countersunk includes the legally prescribed minimum profile depth in the radial direction with respect to the wheel axis. Incipient wear of the indicator element therefore leads to a warning being issued before the legally prescribed minimum profile depth is reached.

According to another development of the invention, the indicator element is diamagnetic or ferromagnetic and is inserted into the tread, with the result that the indicator element changes the magnetic field which is emitted by a magnetic field-emitting element. The magnetic field-emitting element is particularly preferably arranged in the region of the tread, with the result that the indicator element, magnetic field sensor and magnetic field-emitting element components are arranged in the tire. In this context, the magnetic field emitter itself can also be an indicator element. This embodiment has the advantage that it is not necessary to attach components to the vehicle, for example in the wheel case or wheel arch. However, it is also particularly preferred that the magnetic field-emitting element be arranged outside, at a distance from the tire. It is thus possible to mount only the indicator element and magnetic field sensor in the tire, in the region of the tread. An arrangement of the magnetic field-emitting element in the region of the wheel case or the wheel arch is easily possible, which is why this type of arrangement is particularly preferred.

The indicator element is preferably embodied as a spatially limited layer which is oriented essentially parallel to the tread. As the wear of the tire profile increases, the layer wears away and this results in a change in the magnetic field which is sensed in the magnetic field sensor. An indicator element layer has the advantage over spatially extensive indicator elements that no, or virtually no detachment of particles or indicator elements occurs.

According to one preferred embodiment of the tire according to aspects of the invention and the method according to aspects of the invention, the magnetic field sensor is arranged in the same arc region of the tire in the interior of the tire as the indicator element is arranged in the tread on the outside of the tire. The spatial proximity of the magnetic field sensor and indicator element which is achieved in this way, which emits or changes a magnetic field, allows more precise sensing of changes in the magnetic field. The magnetic field sensor and indicator element are particularly preferably arranged essentially at the same location on the inside of the tire and the outside of the tire in order to keep the distance between the two as small as possible.

If the indicator element is embodied as a spatially limited layer, the indicator element is preferably of a size which corresponds at least essentially to the size of the surface of the magnetic field sensor.

According to one preferred embodiment of the method according to aspects of the invention, said method is carried out in a tire module or wheel case module of a tire pressure-monitoring system, wherein the magnetic field sensor is a component of the tire module or of the wheel case module. In order to reduce costs, the magnetic field sensor is particularly preferably integrated into an electronic tire module which is arranged in the interior of the tire and which comprises at least one pressure sensor and one transmitting device for transmitting data from the tire module to a receiving device on the vehicle. An evaluation circuit for evaluating the signals of the magnetic field sensor is also advantageously integrated into the tire module.

The magnetic field sensor preferably operates according to the Hall principle or the AMR principle or the GMR principle.

In order to determine the state of wear of the tread, the indicator element is preferably arranged in the tire profile in such a way that, when a predefined state of wear of the tire profile is reached, the indicator element is subjected to wear or is changed or becomes detached from the tire profile. This changes the magnetic field which is sensed by the magnetic field sensor, since an absent or changed indicator element emits a different magnetic field or changes a magnetic field. The time when the predefined state of wear is reached is therefore detected by means of the output signals of the magnetic field sensor.

In order to be able to carry out multi-stage determination of wear, in one development of the invention indicator elements are arranged at different depths in the profile at least one location on the tire. It is therefore possible, for example, to perform two-stage wear detection, which gives the driver a prewarning when the outermost indicator element changes or becomes detached, and provides a second warning when the internal indicator element changes or becomes detached.

The method with which the profile depth or the tread wear of a tire and/or a tire characteristic is determined is preferably carried out while the vehicle is operating. This is particularly advantageous if the magnetic field sensor is arranged on the vehicle at a distance from the tire, since the changes in the magnetic field owing to the rotation of the tire can therefore be evaluated. The magnetic field sensor is quite particularly preferably arranged in the region of the wheel case or the wheel arch. It is therefore possible to integrate said magnetic field sensor into a wheel case module of a tire pressure-monitoring system.

According to one preferred development in the invention, a tire characteristic for which two states can be defined is detected by means of the direction of the sensed magnetic field. For this purpose, for example a ferromagnetic or permanently magnetic indicator element or a magnetic field-emitting element which is arranged in the tire is orientated parallel or anti-parallel with respect to a preferred direction in order to be able to infer therefrom the presence of the one or other state of the tire characteristic. It is particularly preferably determined whether the tire is a summer tire or a winter tire.

A tire characteristic is detected according to another preferred embodiment of a tire according to aspects of the invention in that in each case at least one indicator element is arranged at two or more locations on the outside of the tire in the tread, distributed over the circumference of the tire, or that an indicator element, particularly preferably an indicator element layer, is arranged over the entire circumference of the tire. A tire characteristic is then inferred by means of the changes of the magnetic field which are sensed by a magnetic field sensor mounted outside the tire, for example in the wheel case, as the tire rotates. For this purpose, the sensed magnetic field profile is compared, for example, with predefined profiles in terms of strength and/or direction and is assigned to a specific characteristic. Alternatively or additionally, changes in the sensed magnetic field profile are evaluated in order to carry out a state-of-wear detection at a plurality of locations simultaneously.

At least one ferromagnetic auxiliary element (flux concentrator) is preferably arranged in the region of the magnetic field sensor. Said auxiliary element increases the magnetic flux density and therefore improves the determination of the magnetic field by means of the magnetic field sensor.

According to one preferred embodiment of the tire according to aspects of the invention, the magnetic field sensor is arranged in a tire module or wheel case module of a tire pressure-monitoring system in order, on the one hand, to integrate the magnetic field sensor into an existing module and, on the other hand to provide better protection for said magnetic field sensor.

According to another preferred embodiment of the tire according to aspects of the invention, the magnetic field sensor is connected to an evaluation means for evaluating the output signals of the magnetic field sensor. If the magnetic field sensor is arranged in a tire module or wheel case module of a tire pressure-monitoring system, the evaluation means is advantageously also mounted in the tire module or wheel case module.

According to one preferred development of the tire according to aspects of the invention, the indicator element or elements is/are not inserted into a recess or recesses (pockets) in the tread until after the tire manufacturing process. The recess or recesses (pockets) themselves are formed in the tire during the tire manufacturing process. The position of the recess or recesses (pockets) is determined by the residual profile depth. The subsequent insertion of the indicator elements simplifies the manufacture of the tire and therefore makes the manufacture more cost-effective.

The invention also relates to a device for determining a profile depth or a tread wear of a tire of a vehicle and/or a tire characteristic, which includes a tire according to aspects of the invention and/or in which device a method according to aspects of the invention is carried out.

One advantage of the invention is that both the indicator element, which indicates the wear of the tire or the tire characteristic, and the magnetic field sensor are arranged in or on the tire. As a result, the distance between the indicator element and the magnetic field sensor is predefined and is independent of, for example, the spring compression of the wheel. Furthermore, the distance between the indicator element and the magnetic field sensor is smaller than if the magnetic field sensor is arranged outside the tire, for example in the wheel case. Both of these facts facilitate accurate and reliable measurement of the magnetic field.

A further advantage of the invention is that the magnetic field sensor can be integrated into an electronic module of a directly measuring tire pressure-monitoring system. Such electronic modules are mounted, for example, in the region of the tread on the inner liner of the tire and comprise, for example, at least one or more of the following elements: a pressure sensor, a temperature sensor, a battery and/or a generator for generating electrical energy from kinetic energy, an electronic circuit for evaluating signals, and components for transmitting and/or receiving signals. It is therefore easily and cost-effectively possible also to integrate a magnetic field sensor into such a module.

BRIEF DESCRIPTION OF THE DRAWINGS

Further preferred embodiments of the invention emerge from the following description by means of figures, in which, in each case in a schematic form.

DETAILED DESCRIPTION OF THE PREFERRED EMBODIMENTS

Figure 1:
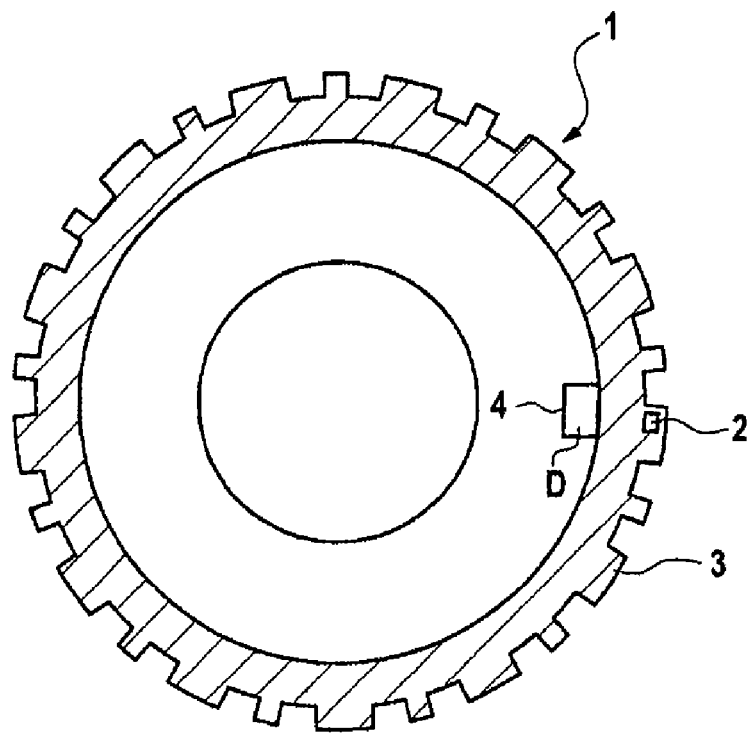
FIG. 1 shows a first and second exemplary embodiment of a tire according to aspects of the invention.
Figure 1:
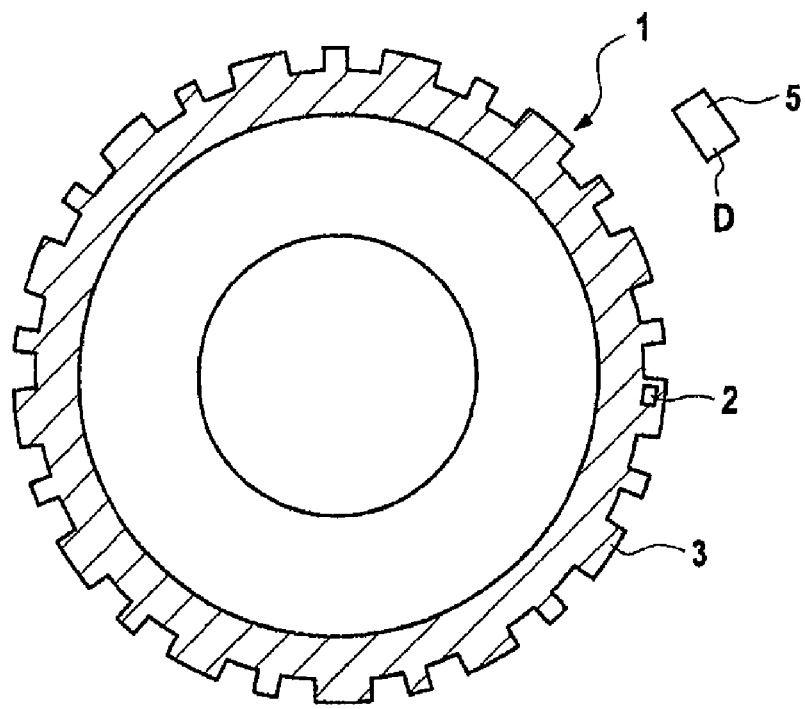

A first exemplary embodiment of a tire according to aspects of the invention is illustrated schematically in FIG. 1a. An electronic module 4 is mounted in the interior of the tire 1. The module 4 comprises a magnetic field sensor D which senses a magnetic field B which is emitted by a magnet 2 which is inserted into the profile 3 of the tire 1 on the outside (profile side). The electronic module 4 also includes, for example, an electronic system and sensor system which measure inter alia the tire air pressure and can transmit the latter to a suitable receiver which is mounted, for example, on the vehicle.

FIG. 1b is a schematic illustration of a second exemplary embodiment of a tire according to aspects of the invention. A permanent magnet 2 is inserted into the tire profile 3 of the tire 1, in a way which corresponds to the first exemplary embodiment. The magnetic field B which is emitted by the permanent magnet 2 is sensed by a magnetic field sensor D which is located in the module 5. The module 5 is arranged, for example, in the wheel case and detects, during travel, the magnet 2 which is carried past the module 5. Before the minimum profile depth is reached, the effect of the permanent magnet 2 (emission of a magnetic field with a specific strength and direction) at this location will be reduced or eliminated due to wear or ejection. This change in the emitted magnetic field B is sensed by the magnetic field sensor D in module 5 and can be correspondingly evaluated.

The underlying technical principle of the first and second exemplary embodiment is based on the detection of at least one magnet 2 which is inserted into the tread surface of the tire 1 and which can be inserted into the tire 1 in, for example, a way which is comparable to conventional spikes, wherein the magnet 2 is inserted to such a depth that, before a triggering threshold is reached, said magnet 2 loses its hold in the tire 1 due to the wearing of the tire profile 3, and is therefore lost or loses magnetic force due to the wear. The disappearance of the magnetic field B (when the magnet 2 becomes detached) and/or the reduction or changing of the magnetic field B (when the magnet 2 is subjected to wear) indicates that a state of wear which is predefined by the position of the magnet 2 is reached.

Instead of the magnet 2 which is mounted in the profile 3, a local, magnetic location ("magnetic rubber") in the profile 3, which location loses magnetic force due to the wearing of the tire profile 3, is also possible. A planar magnet 2 or a planar magnetic location (for example layer) can also be implemented.

When there is wearing of the magnet 2 or of the magnetic location/layer in the profile 3, a gradual or graduated detection of wear is possible: the greater the degree of wear the smaller the magnetic field B.

Figure 2:
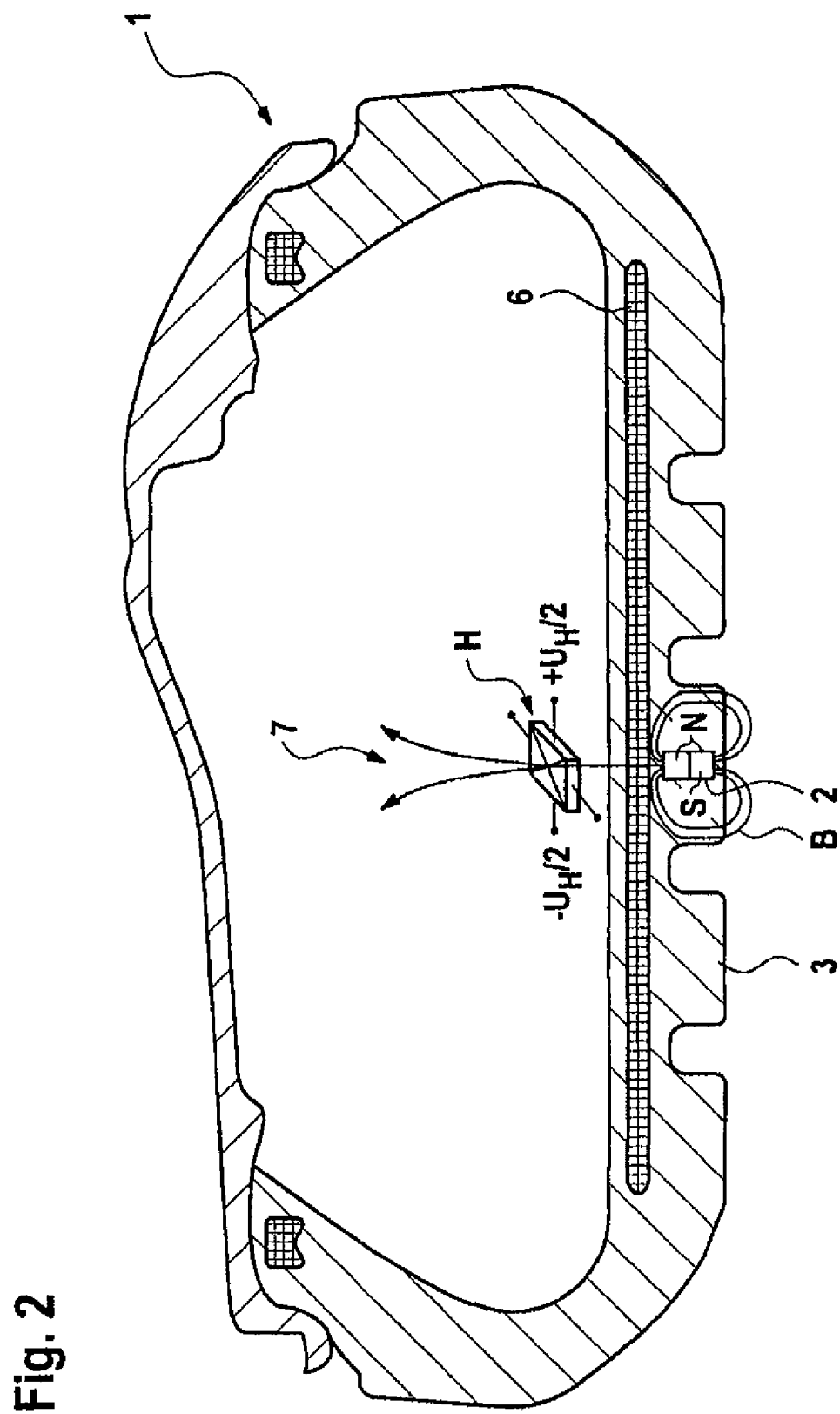
FIG. 2 shows a cross-sectional representation of a tire according to the first exemplary embodiment.

FIG. 2 is a schematic illustration of a cross-sectional illustration of a tire according to the first exemplary embodiment. Essentially only the components of a tire which are relevant for understanding the invention, specifically the profile 3 (tread) and the steel belt 6 are illustrated in tire 1. The steel belt 6 contributes to the strength of the tire 1 and provides a screen against magnetic fields B. A permanent magnet 2 is arranged on the outside of the tire in the tire profile 3. The magnetic field B which is emitted by said permanent magnet 2 is indicated by a number of exemplary arrows in FIG. 2. For example a Hall element H is used as a magnetic field sensor D. A Hall voltage $U_H$ which is proportional to the magnetic flux density 7 passing through the Hall element H drops across the Hall element H. The Hall element H is arranged in the interior of the tire (on the inside of the tire). The Hall voltage $U_H$ which is generated can be processed and evaluated electronically.

Figure 3:
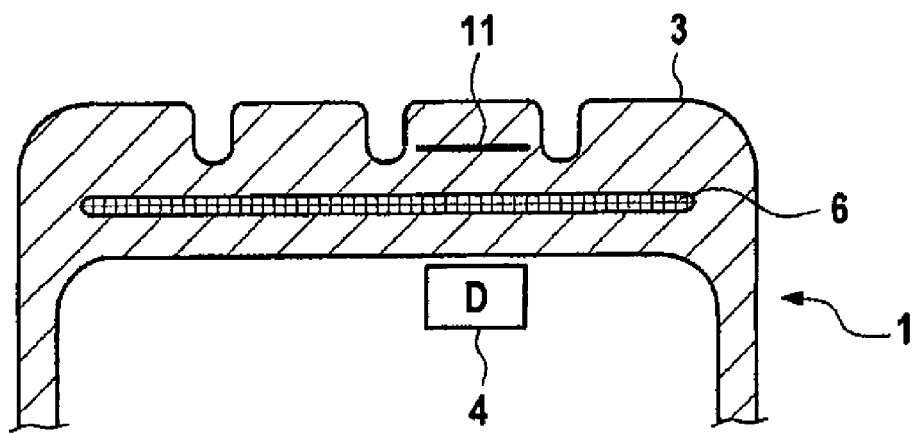
FIG. 3 shows a third and fourth exemplary embodiment of a tire according to aspects of the invention.
Figure 3:
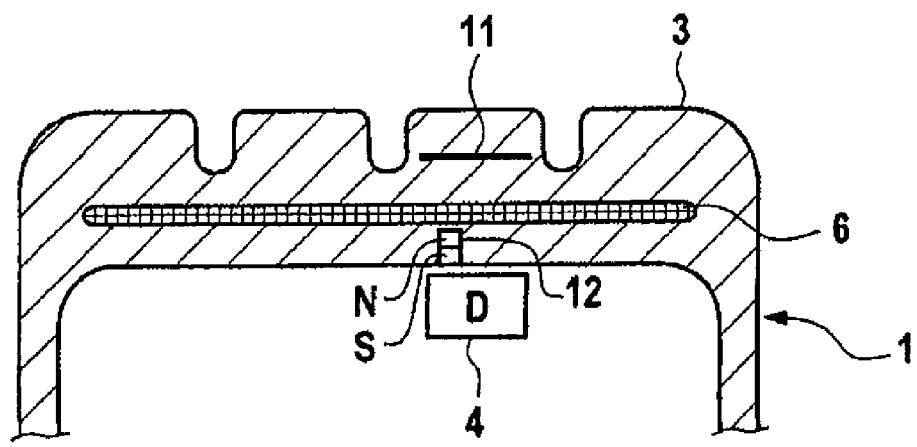

FIG. 3 is a schematic illustration of a third and a fourth exemplary embodiment of a tire according to aspects of the invention. The two exemplary embodiments have in common the fact that, on the one hand, a tire module D with a magnetic field sensor D, for example a Hall element, is mounted on the inside of the tire 1, for example in the region of the tread, and, on the other hand, a magnetically active deflector layer 11 (for example a ferromagnetic foil or ferromagnetically enriched rubber) is mounted in the tire profile 3.

According to the third exemplary embodiment illustrated in FIG. 3a, a magnetic field emitter 10 is installed in the wheel arch (or behind it). The polarization vector of the magnetic field emitter 10 tends, for example, (virtually) perpendicularly with respect to the wheel axis. The magnetic field which is emitted by the magnetic field emitter 10 is changed by the layer 11, and the resulting magnetic field B is sensed by the sensor D (for example Hall element) which is arranged underneath the deflector layer 11 (in the interior of the tire).

According to the fourth exemplary embodiment illustrated in FIG. 3b, a magnetic field emitter 12 is arranged in the region between the deflector layer 11 and the sensor D. The magnetic field which is emitted by the magnetic field emitter 12 is changed by the layer 11, and the resulting magnetic field B is sensed by the sensor D (for example Hall element) which is arranged in the interior of the tire.

According to a fifth exemplary embodiment (not illustrated), a magnetic field sensor D is arranged outside the tire, for example in the wheel case. A magnetically active deflector layer 11 is inserted into the tire profile 3, and a magnetic field emitter 12 is arranged in the region between the deflector layer 11 and the interior of the tire (deflector layer 11 and magnetic field emitter 12 according to FIG. 3b), for example). The magnetic field which is emitted by the magnetic field emitter 12 is changed by the layer 11, and the resulting magnetic field B is sensed by the magnetic field sensor D outside the tire. It is possible to mount the deflector layer 11 and the magnetic field emitter 12 at just one location in the tire or else distribute them respectively at a plurality of locations over the circumference of the tire, for example they can even be embodied as a completely continuously surrounding layer/element.

The magnetic field which is emitted by the magnetic field emitter 10 or 12 is at least partially changed or screened by the deflector layer 11 with the result that a specific magnetic field B is measured at the sensor D. The deflector layer 11 is, for example, very thin and successively erodes as the profile 3 correspondingly experiences wear. As a result, the changing or screening of the magnetic field by the deflector layer 11 varies, and consequently the sensor D measures a different magnetic field B when the deflector layer 11 experiences wear. The changing of the magnetic field B at the sensor D when wear occurs is used as a measure of the detection of wear.

An advantage of the deflector layer 11 is that the wear does not result in ejected particles. This approach is recommended in particular for a case in which the mesh in the surface of the tread is magnetically transparent and can work its way out from the wheel arch with low magnetic field strengths.

The information about the state of wear is passed on to a vehicle system, for example ABS (anti-lock brake system), ESP (electronic stability program) and/or tire monitoring system, by means, for example, of the module 4, 5 in which the magnetic field sensor D is arranged. Depending on the configuration of the corresponding vehicle system, the information about the wear can also be used to control the brake pressure.

Additionally or alternatively, the information about the state of wear is transmitted as a warning display (request to change tires) or pre-warning (tire change in for example 5000 km) to the driver, for example.

The invention permits detection of wear of a tire profile at a defined wear point and can be easily and cost-effectively combined with tire pressure sensors etc. (tire modules 4) mounted in the interior of the tire (see first, third and fourth exemplary embodiment), since the magnetic field sensor D is also arranged in the interior of the tire.

In addition to or as an alternative to the detection of the residual profile of the tire, the invention permits at least one tire characteristic, which is encoded in the tire by means of the indicator element or the indicator elements 2, 11, to be determined.

Correspondingly, according to a further exemplary embodiment of the invention, it is possible to differentiate between summer tires and winter tires. In addition to the differentiation of summer tires and winter tires, any other tire properties can be correspondingly encoded as a black/white decision. For example, the differentiation of summer tires and winter tires can be achieved by means of the polarity of the magnetic fields of the permanent magnet or magnets 2, 12 inserted, in particular, into the tire (in, for example, the first, second or fourth exemplary embodiments). The detection of the summer tires or winter tires is realized, for example, by means of the installation direction, for example the north pole of the magnet 2, 12 points radially outward from the tire in the case of summer tires, while in the case of winter tires the south pole of the magnet 2, 12 points radially outward. This method of tire detection is particularly advantageous in a passenger car which is equipped with a magnetic field sensor D outside the tire (see, for example, the second or fifth exemplary embodiment), since in this way the type of tires, is, for example, detected automatically in the vehicle and, for example, the use of winter tires can be recommended to the driver.

If, according to a further exemplary embodiment, a plurality of indicator elements (magnets 2 or (deflector layers 11) limited in area) or permanent magnet elements 12 are inserted into the tire at different locations, it is possible, when the tire 1 rotates, to use the distance factor, the polarization and the number and arrangement of the elements to transmit information about tire characteristics, for example type of tire, permissible maximum speed, summer/winter etc. (in encoded form) to the vehicle on which the magnetic field sensor D is mounted, for example in the wheel case region (see, for example, second and fifth exemplary embodiments). In a vehicle control system, the measured magnetic field profile per revolution of the wheel is compared with stored profiles and the tire property or properties is/are therefore decoded.

According to a further exemplary embodiment, wheel speed information for the vehicle is also generated as an additional output signal by means of the signals of the magnetic field sensor D which is arranged outside the tire 1, for example in a wheel case module 5.

According to a further exemplary embodiment of the invention, a plurality of magnets 2, 12 are countersunk into the profile 3, distributed over the circumference of the tire, or the deflector layer 11 is mounted at a plurality of locations or over the entire circumference of the tire. It is therefore possible to monitor a plurality of regions/all the regions of the tire for profile wear. For the purpose of detection, the magnetic field sensor D is arranged outside the tire, for example in the wheel case (see, for example, the second and fifth exemplary embodiments).

Furthermore, in all the exemplary embodiments, it is possible to carry out multi-stage detection of wear by inserting a plurality of magnets 2 or deflector layers 11 to different depths of the tire profile 3.

According to one exemplary method or exemplary tire, a magnetic circuit in the physical sense between the inside of the tire (magnetic field sensor D) and outside of the tire is used to infer the state or the presence of or damage to diamagnetic, ferromagnetic or permanently magnetic indicator element in this magnetic circuit.

According to another exemplary method or exemplary tire, a magnetic field sensor D outside the tire, preferably on the wheel case, is used to infer the presence of or damage to a diamagnetic, ferromagnetic or permanently magnetic indicator element in the tire profile 3 (outside of the tire).

For example (see, for example, first and second exemplary embodiments), the magnetic circuit is formed by a miniature permanent magnet 2 as a magnetic field emitter on the outside of the tire and by a Hall sensor H as the magnetic field detector D on the inside of the tire or in the wheel case.

According to another exemplary embodiment (see, for example, fourth and fifth exemplary embodiments), the magnetic circuit is formed by a miniature permanent magnet 12 as a magnetic field emitter on the inside of the tire and by a Hall sensor H as the magnetic field detector D on the inside of the tire or in the wheel case plus a ferromagnetic or diamagnetic body 11 as a field modulator on the outside of the tire.

Likewise, the magnetic circuit can be formed by a permanent magnet 2 or a coil as a magnetic field emitter in the wheel arch and by a Hall sensor H as the magnetic field detector D on the inside of the tire plus a ferromagnetic or diamagnetic body 11 as a field modulator on the outside of the tire (see, for example, third exemplary embodiment).

For example, one or more ferromagnetic bodies (flux concentrators) is/are placed by the side of the field detector (magnetic field sensor D) to assist the sensing by increasing the flux density.

The manufacture of a tire according to aspects of the invention is suitable in an optimum way for OEM (original equipment manufacturer) furnishing of tires with means of sensing tire profiles, but is also conceivable for retrofitting. To perform retrofitting, the magnets 2 are, for example, subsequently inserted into position pockets in the profile 3, which are formed during the tire manufacturing process. Alternatively, the position pockets are also not formed in the profile 3 until after the tire manufacturing process and are then provided with magnets 2. For this purpose, for example defined recesses, which hold the indicator elements 2, are drilled into the tire profile 3, and the recesses are then closed again with a filler material. The position of the pockets/recesses is relevant here, and it defines the residual strength of the profile.

The magnetic field sensor D is, for example, a Hall element H or a magneto-resistive sensor element. However, any type of magnetic field sensor can be used.

The invention claimed is:

1. A method for determining a profile depth or wear on a tread of a tire of a vehicle and/or a tire characteristic, said method comprising the steps of:
sensing a magnetic field, which is emitted by at least one magnet that is arranged within the tread of the tire, by a removable magnetic field sensor that is arranged on an interior surface of the tire after the tire is manufactured; and
determining a current state of wear of the tread and/or the tire characteristic based on output signals of the magnetic field sensor.

2. The method of claim 1 wherein the magnetic field sensor is arranged in a region of the tread on the inside of the tire or at a distance from the tire.

3. The method of claim 2 wherein the magnetic field sensor is arranged at a distance from the tire in a region of a wheel case or of a wheel arch of the vehicle.

4. The method of claim 1 wherein the tire characteristic is a type of tire and/or a permissible maximum speed of the tire.

5. The method as claimed in claim 1, wherein the magnetic field sensor senses a strength and/or a direction of the magnetic field, and wherein the current state of wear of the tread is determined by evaluating a sensed strength of the magnetic field and/or the tire characteristic by evaluating the sensed strength and/or direction of the magnetic field or the profile of the sensed strength and/or direction during rolling of the tire.

6. The method as claimed in claim 1, wherein at least one indicator element is permanently magnetic or ferromagnetic and is countersunk into the tread.

7. The method as claimed in claim 6, wherein the at least one indicator element is countersunk into a recess in the tread to at least one depth.

8. The method as claimed in claim 1, wherein an indicator element is diamagnetic or ferromagnetic and is a layer that is inserted into the tread, and wherein the indicator element changes the magnetic field which is emitted by the magnet, wherein the magnet is arranged in a region of the tread on the inside of the tire or in a region of a wheel case or a wheel arch.

9. The method as claimed in claim 8, wherein the magnetic field is emitted by a permanent magnet or a magnetic field-generating coil.

10. The method as claimed in claim 1, wherein the tire characteristic is whether the tire is a summer tire or a winter tire, and the tire characteristic is detected by a direction of the sensed magnetic field.

11. The method as claimed in claim 1, wherein said method is carried out in a tire module or wheel case module of a tire pressure-monitoring system, wherein the magnetic field sensor is a component of the tire module or of the wheel case module, and wherein the tire module is arranged in an interior of the tire and comprises at least one pressure sensor and one transmitting device for transmitting data from the tire module to a receiving device on the vehicle.

12. The method as claimed in claim 11, wherein the tire module is arranged in a region of the tread on the inside of the tire.

13. A tire for carrying out the method as claimed in claim 1, wherein at least one indicator element, which changes the magnetic field, is arranged on an outside of the tire and in the tread of the tire.

14. The tire of claim 13, wherein the magnetic field sensor is arranged in the region of the tread on the inside of the tire, or at a distance from the tire.

15. The tire of claim 14, wherein the magnetic field sensor is arranged in a region of a wheel case or of a wheel arch of the vehicle.

16. The tire as claimed in claim 13, wherein one or more ferromagnetic auxiliary elements are arranged in a region of the magnetic field sensor.

17. The tire as claimed in claim 13, wherein the magnetic field sensor is arranged in a tire module or wheel case module of a tire pressure-monitoring system, wherein the tire module is arranged in an interior of the tire in a region of the tread on the inside of the tire, and wherein the tire module comprises at least one pressure sensor and one transmitting device for transmitting data from the tire module to a receiving device on the vehicle.

18. The tire as claimed in claim 13, wherein the at least one indicator element is permanently magnetic or ferromagnetic and is countersunk into the tread.

19. The tire as claimed in claim 18, wherein the at least one indicator element is countersunk into a recess in the tread to at least one depth.

20. The tire as claimed in claim 13, wherein two or more indicator elements are arranged at one location on the tire, at respective different depths in the tread.

21. The tire as claimed in claim 13, wherein, in each case, at least one indicator element is arranged at two or more locations on the outside of the tire in the tread, distributed over a circumference of the tire.

22. The tire as claimed in claim 13, wherein the magnetic field sensor is arranged in an arc region of the tire in the interior of the tire, in which the indicator element is arranged in the tread on the outside of the tire.

23. The tire as claimed in claim 22, wherein the magnetic field sensor is arranged in a quarter-arc region of the tire.

24. The tire as claimed in claim 13, wherein the magnetic field sensor is connected to an evaluation means for evaluating output signals of the magnetic field sensor in which a method for determining a profile depth or wear on a tread of a tire of a vehicle and/or a tire characteristic is carried out.

25. The tire as claimed in claim 24, wherein the evaluation means is arranged in the interior of the tire.

26. A method for determining a profile depth or wear on a tread of a tire of a vehicle and/or a tire characteristic, said method comprising the steps of:

sensing a magnetic field, which is emitted by at least one magnet that is inserted within the tread of the tire after the tire is manufactured, by a removable magnetic field sensor that is coupled to a chassis of the vehicle; and determining a current state of wear of the tread and/or the tire characteristic based on output signals of the magnetic field sensor.

27. A method for determining a profile depth or wear on a tread of a tire of a vehicle and/or a tire characteristic, said method comprising the steps of:

sensing a magnetic field emitted by a magnetic field emitting element, the emitted magnetic field is changed by at least one indicator element that is arranged on the outside of the tire and within the tread, by a magnetic field sensor that is arranged in an interior of the tire or coupled to a chassis of the vehicle; and determining a current state of wear of the tread and/or the tire characteristic on a basis of output signals of the magnetic field sensor.

28. The method as claimed in claim 27, wherein the indicator element is diamagnetic or ferromagnetic and is a layer that is inserted into the tread, and wherein the indicator element changes the magnetic field which is emitted by a magnetic field-emitting element, wherein the magnetic field-emitting element is arranged in a region of the tread on the inside of the tire or at a distance from the tire.

29. The method as claimed in claim 28, wherein the magnetic field-emitting element is arranged in a region of a wheel case or of a wheel arch.

30. The method as claimed in claim 28, wherein the magnetic field is emitted by a permanently magnetic element or a magnetic field-generating coil.

* * * * *